United States Patent [19]

Ruehle

[11] Patent Number: 4,604,734
[45] Date of Patent: Aug. 5, 1986

[54] SEISMIC EXPLORATION IN AREAS WHERE P WAVES ARE CONVERTED TO S WAVES

[75] Inventor: William H. Ruehle, Duncanville, Tex.

[73] Assignee: Mobil Oil Corporation, New York, N.Y.

[21] Appl. No.: 501,338

[22] Filed: Jun. 6, 1983

Related U.S. Application Data

[63] Continuation of Ser. No. 220,889, Dec. 29, 1980, abandoned.

[51] Int. Cl.$^4$ .......................... G01V 1/34; G01V 1/28
[52] U.S. Cl. ........................................ 367/63; 367/75; 364/421
[58] Field of Search ....................... 367/50, 59, 63, 75; 364/421

[56] References Cited

U.S. PATENT DOCUMENTS

| | | | |
|---|---|---|---|
| 2,390,187 | 12/1945 | Sharpe | 367/75 |
| 3,333,238 | 7/1967 | Caldwell | 367/75 |
| 3,651,451 | 3/1972 | Ruehle | 367/50 |
| 3,940,734 | 2/1976 | Blum | 367/63 |
| 4,110,729 | 8/1978 | Vreugde | 367/63 |
| 4,206,509 | 6/1980 | Ruehle | 367/63 |
| 4,316,267 | 2/1982 | Ostrander | 367/59 |

FOREIGN PATENT DOCUMENTS 2252261 5/1974 Fed. Rep. of Germany ........ 367/75

OTHER PUBLICATIONS

Gregory, "Fluid Saturation . . . Rocks", 10/76, pp. 895-921, Geophysics, vol. 41, #5.
Brewer, "How Horizontal Stacking . . . Industry", 10/67, World Oil, pp. 137-149.
Omnes, "Exploring with SH-Waves", 5/11/78, pp. 40-49, CS&G Nat. Conv., Calgary.

*Primary Examiner*—Nelson Moskowitz
*Attorney, Agent, or Firm*—Alexander J. McKillop; Michael G. Gilman; Charles J. Speciale

[57] ABSTRACT

Field seismograms are gathered into sets having reflections from asymmetrical common reflection points where there is a conversion between longitudinal waves and shear waves. The gathered seismograms are stacked to produce a seismic section which emphasizes the reflections from particular types of formations. In particular, reflections from formations having a significant difference in longitudinal to shear wave velocity, such as oil and gas saturated formations, are emphasized in the stacked section.

4 Claims, 11 Drawing Figures

MODES OF PROPAGATION

SYMMETRICAL

ASYMMETRICAL

SEISMIC EXPLORATION IN AREAS WHERE P WAVES ARE CONVERTED TO S WAVES

This is a continuation of co-pending application Ser. No. 220,889, filed Dec. 29, 1980, now abandoned.

BACKGROUND OF THE INVENTION

This invention relates to seismic exploration, and more particularly, to a method of enhancing seismic sections obtained in areas where shear waves are detected.

In seismic exploration, seismic energy is generated by a source located at or near the surface of the earth, is reflected from subsurface interfaces between layers of the earth, and is received by a spread of seismic detectors having different offsets from the source on the surface of the earth. The detected seismograms are gathered, stacked, and recorded in the form of a set of common deth point (CDP) seismic traces as illustrated, for example, in FIG. 1 of U.S. Pat. No. 4,206,509—Ruehle. From these recorded CDP seismic traces the subsurface interval velocities can be determined. Such a CDP gathering and recording technique and a continuous velocity determination technique are disclosed in U.S. Pat. No. 3,651,451—Ruehle. An accurate velocity determination is quite important in the determination of the nature and extent of the subsurface layering.

While CDP exploration techniques have been very successfully used, many unexplained phenomena occur on seismic sections. For example, many seismic sections have low frequency interfering sets of reflections which have the appearance and velocity of multiple reflections. Other phenomena which have evoked a great deal of interest in the exploration for hydrocarbons are the so called "bright spots" or HCI (hydrocarbon indicators) which appear on some seismic sections.

In accordance with an important aspect of my invention, I have demonstrated that many previously unexplained phenomena on seismic sections are caused by the conversion of longitudinal waves (p waves) to shear waves (s waves) at subsurface interfaces.

The existence of longitudinal waves and shear waves in the propagation of seismic energy through the earth is well known. This phenomenon has been well identified and used in well logging, where an acoustic transmitter and detector traverse a bore hole through the earth. See, for example, U.S. Pat. No. 3,333,238, Caldwell.

In seismic exploration shear waves are produced by some sources, notably vibratory seismic sources. However, studies on shear wave reflections in seismograms have not been fruitful. Except where the p wave to s wave conversion occurs near the surface and a symmetrical travel path exists, conventional CDP methods for enhancing the reflections cannot be applied. Furthermore, the s wave attenuation for deep arrivals reduces the amplitudes far below those of multiple and primary longitudinal reflections.

SUMMARY OF THE INVENTION

In accordance with the present invention, field seismograms are gathered into sets having reflections from common reflecting points where seismic longitudinal waves are reflected as shear waves. These sets are stacked to produce a seismic section which emphasizes the longitudinal to shear (ps) wave reflections.

In conventional common depth point exploration, it is assumed that the reflection point is symmetrical, i.e., equally spaced between the source and the detector. Seismograms which have been shot with different offsets between source and receiver are gathered into sets which have a common symmetrical reflecting point. In areas where p waves from the source are converted into s waves at the reflecting point, the reflecting point may be asymmetrical because of differences in the velocity of p waves and s waves in certain formations. In accordance with the present invention, seismograms having different offsets between the source and detector are gathered into sets having common p wave to s wave reflecting points.

After the field seismograms are gathered into sets representing common p to s reflection points, the velocity over both the p wave path and the s wave path is determined. This velocity is used to normal moveout correct the sets of p/s reflection point seismograms. After normal moveout correction, the seismograms are stacked to form a final section which emphasizes reflections from interfaces wherein p waves are converted to s waves. Seismic sections such as this are particularly useful in identifying interfaces between liquid or gas bearing rocks and solid rock formations. The identification of such interfaces is particularly important in exploration for hydrocarbons.

The foregoing objects, features and advantages of the invention will be better understood from the following more detailed description and appended claims.

DESCRIPTION OF THE PREFERRED EMBODIMENT

Figure 1A:
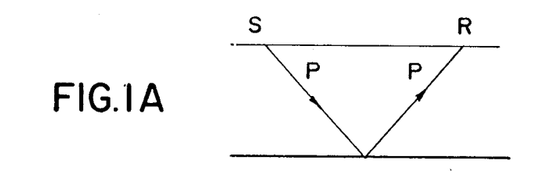
FIGS. 1A-1D show the reflection points for longitudinal and shear wave propagation and combinations thereof.
Figure 1B:
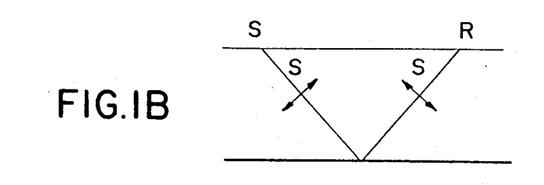
Figure 1C:
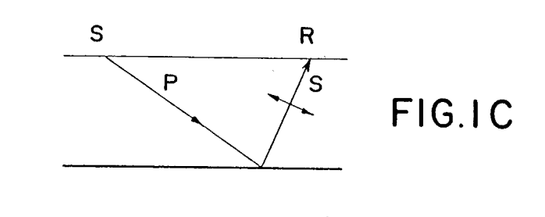
Figure 1D:
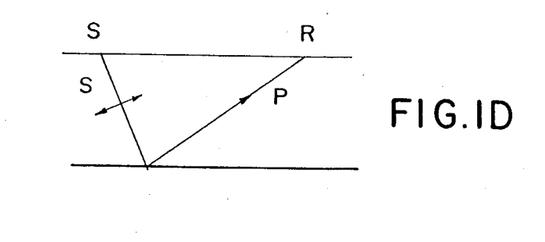

Referring to FIG. 1A, in conventional seismic exploration, p waves from a conventional source travel to a reflecting interface and travel as longitudinal waves to a seismic detector or receiver. In some types of exploration, the source generates shear waves. Certain types of vibrators particularly impart shear waves into the earth where they are reflected as shear waves and are detected at the receiver as indicated in FIG. 1B. This type of symmetrical propagation is by far the most common and conventional CDP gathering techniques are based on the assumption that the reflection point is symmetrical with respect to the source and receiver. However, the reflection points are not necessarily symmetrical because in some areas there is a conversion from longitudinal wave to shear wave propagation at some interfaces. When a longitudinal wave is converted to a shear wave at the reflection point, as shown in FIG. 1C, and when a shear wave is converted to a longitudinal wave at the reflection point, as shown in FIG. 1D, the reflection points are asymmetrical with respect to the source and receiver. This is caused by the fact that the velocity of a shear wave is different than the velocity of the longitudinal wave in some formations.

Figure 2:
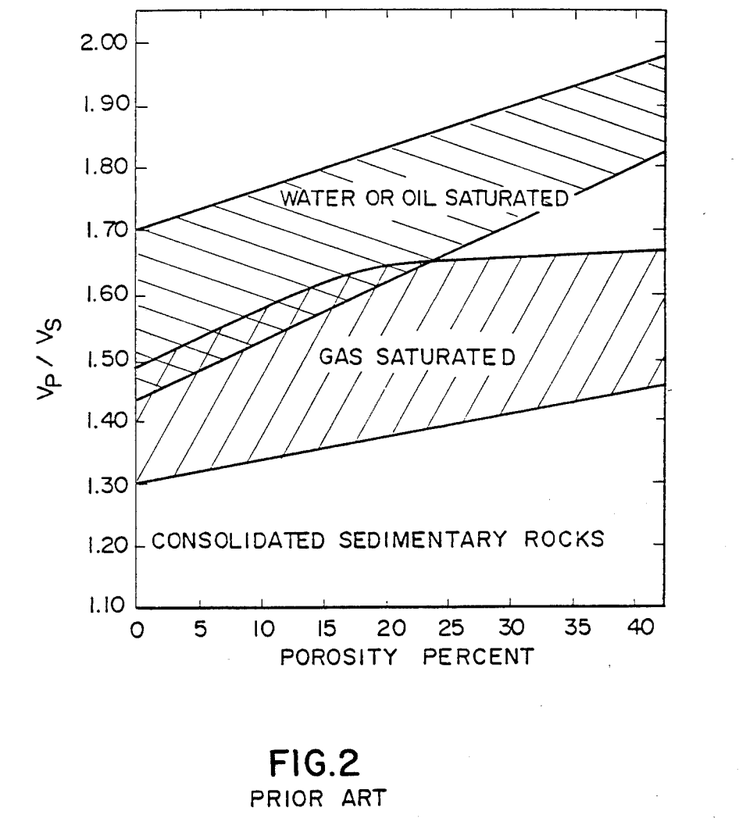
FIG. 2 is a graph from the prior art showing the variation of longitudinal and shear wave velocity with porosity for liquid and gas saturated rocks.

FIG. 2 is a graph based on A. R. Gregory, *Geophysics*, Vol. 41, No. 5, October 1976, pp. 895–921. It shows the ratio of longitudinal wave velocity, $V_p$, to shear wave velocity, $V_s$, in rocks of different porosity at confining pressures from 0 to 10,000 psi. For gas saturated rocks, and for water or oil saturated rocks, there is a significant difference between the longitudinal wave and the shear wave velocity. (Insofar as seismic velocity is concerned there is little difference between water and oil saturated rock). This significant difference in longitudinal to shear wave velocities gives rise to asymmetrical reflection points as explained with reference to FIGS. 1C and 1D.

Figure 3:
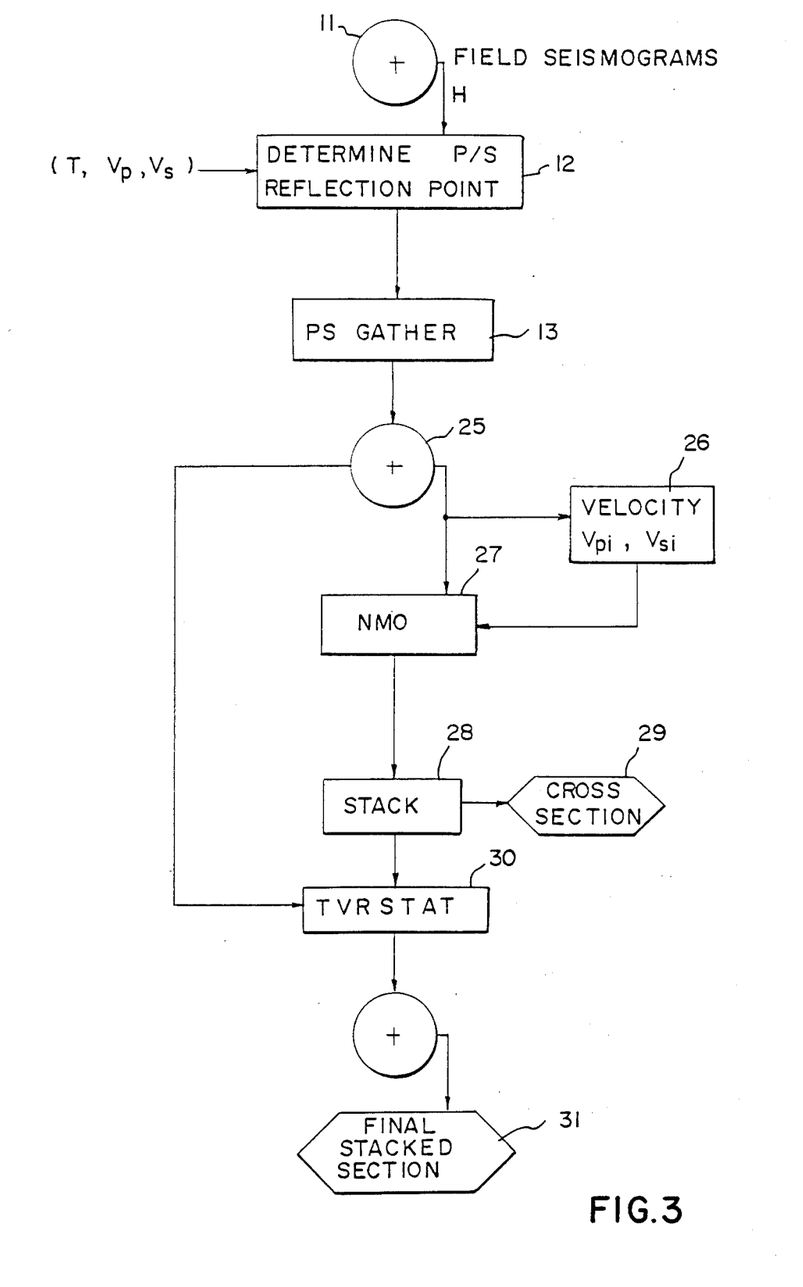
FIG. 3 is a flow sheet depicting the present invention.

In accordance with the present invention, reflections from these asymmetrical reflection points are emphasized by stacking those traces having common reflection points. As shown in FIG. 3, field seismograms 11 are conventionally obtained and recorded on magnetic tape. These field seismograms contain header information which includes the horizontal off-set between the source and the detector for each trace. From this horizontal offset, and from the longitudinal wave velocity $V_p$ and the shear wave velocity $V_s$, the longitudinal to shear wave reflection point for each trace is determined as indicated at 12. Initially, the values of the $V_p$ and $V_s$ may be taken from known studies of the area being explored, or they may be obtained from the field seismograms themselves in accordance with the velocity determination techniques disclosed in Ruehle, U.S. Pat. Nos. 3,651,451 or 3,696,331. Alternatively, velocity can be determined from the seismograms which are stacked in accordance with the present invention to get an even better estimate of velocity. The present invention can be run iteratively with these successively better values of velocity.

Figure 4:
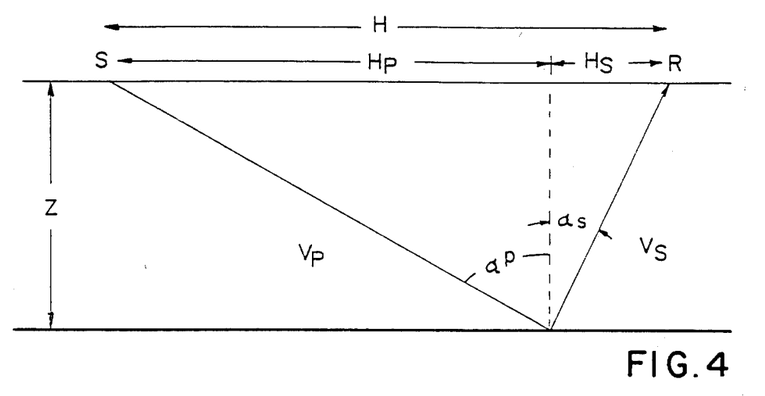
FIG. 4 is a ray diagram showing the parameters defining the p/s reflection point.

The manner in which the p/s wave reflection point is determined for each trace will be better understood with reference to FIG. 4. In FIG. 4, the reflection point is defined by the horizontal distance $H_p$ or $H_s$. These can be determined given the values $V_p$, $V_s$ and Z. Depth is directly related to record time. The procedure of the present invention is used to emphasize reflections at a particular record time for which $V_p$ and $V_s$ are known or assumed. The procedure can be repeated for other record times at which the appropriate values of $V_p$ and $V_s$ are used. For each trace, the ratio H/Z is known, and therefore, the reflection angle $\alpha_s$ can be determined from the following:

$$H/Z = \tan \alpha_s + \tan \left( \sin^{-1} \left( \frac{V_p}{V_s} \sin \alpha_s \right) \right)$$

Knowing the reflection angle $\Delta_s$, the angle of incidence, $\Delta_p$, can be determined from Snell's law:

$$\frac{\sin \alpha_p}{V_p} = \frac{\sin \alpha_s}{V_s}$$

Knowing the angle of incidence and the angle of reflection, the reflection points $H_p$, or $H_s$, can be determined from:

$$H_p = Z (\tan \alpha_p)$$

$$H_s = Z (\tan \alpha_s).$$

Figure 5:
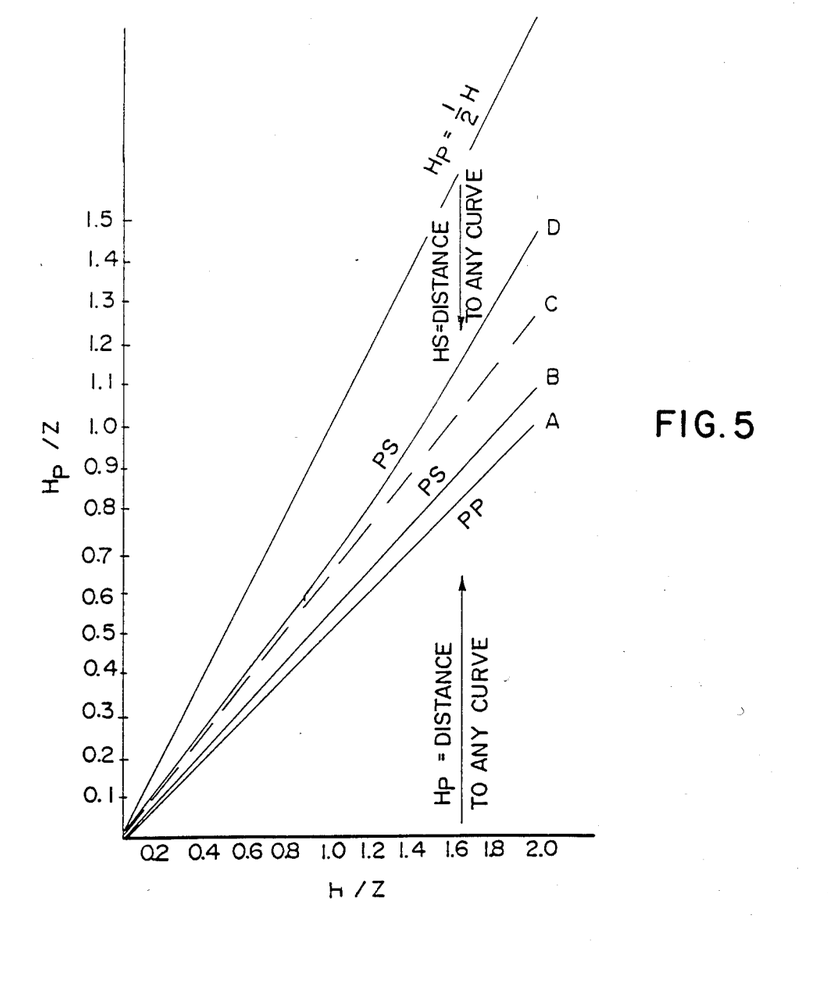
FIG. 5 shows the manner of determining reflection points for a range of longitudinal to shear wave velocities.

For each trace and for each record time, the asymmetric p/s reflection point for an assumed value of $V_p/V_s$ is determined. Then, the traces having this common reflection point are gathered as indicated at 13 in FIG. 3. The procedure for gathering the traces is summarized in the chart of FIG. 5 which shows H/Z as a function of $H_p/Z$ for different assumed values of $V_p/V_s$. The line A is the 45° line. It specifies the common reflection point Hp for conventional CDP gathering of the type shown for example, in FIG. 1 of U.S. Pat. No. 4,206,509. The line D specfies the reflection point for p/s reflections with an assumed velocity ratio $V_p/V_s$ of 2.0. The line C is for an assumed ratio of 1.7 and the line B is for an assumed ratio of 1.1. It will be apparent that as the processing proceeds to other reflection times, the ratio of the $V_p/V_s$ can be changed for different rock formations.

Figure 5A:
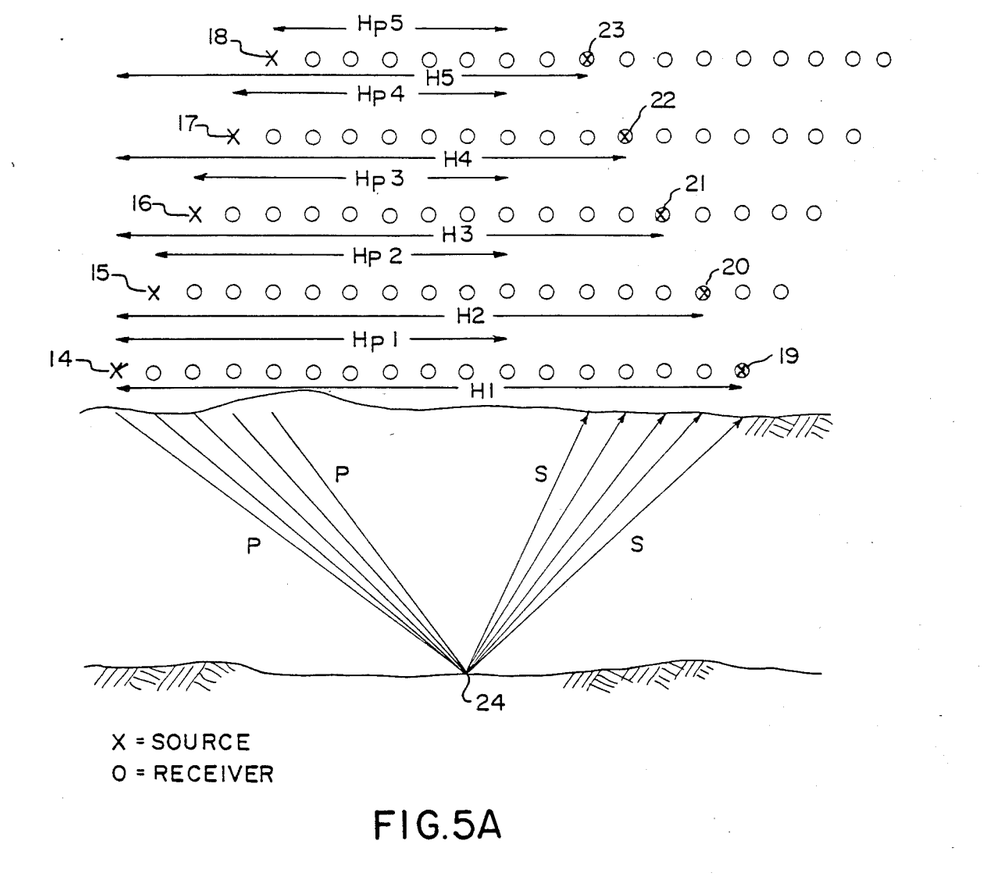
FIG. 5A shows the manner of gathering seismograms with common asymmetrical reflecting points.

A simplified example of the seismogram gather of the present invention is shown in FIG. 5A which depicts a conventional field procedure in which seismic energy is produced by the source at the location 14 and detected at a string of detectors. Then the source is moved to the location 15 and the string of sixteen detectors again detects the generated seismic energy. (The locations 14–18 lie on the same line of explorations as the detectors. For convenience of explanation, the line has been shown five times in FIG. 5A.) A seismic field record including the traces from each of the sixteen detectors is produced. This is repeated with the source at location 16, 17, and 18. From these records, the traces from the detectors 19–23 have reflections from the common subsurface asymmetrical reflection point 24. For all traces, the p/s reflection point was determined. For example, the reflection points $H_p1$, $H_p2$ ... $H_p5$ are determined. For each of the traces, the horizontal offset, including the offsets $H_1$, $H_2$ ... $H_5$ are known from the header. In accordance with the present invention, traces are gathered which have the same asymmetrical reflecting point, i.e., $H1 - H_{p1} = H2 - H_{p2}$ ... $H5 - H_{p5}$. In the simplified example of FIG. 5A, five fold coverage of the asymmetrical reflection point 24 has been described, but in practice the coverage will be greater.

The traces gathered with common asymmetrical p/s reflection points are recorded on magnetic tape as indicated at 25 in FIG. 3. From the traces gathered into sets in this manner, the velocity can be determined as indicated at 26. The velocity determination is made in accordance with the continuous velocity determination technique in Ruehle U.S. Pat. No. 3,651,451 or the VIP DIP velocity determination disclosed in Ruehle U.S. Pat. No. 3,696,311. Using these values of velocity, the seismic records or sets are normal moveout corrected as indicated at 27. This is a conventional time shifting operation to compensate for the offset between different traces. When this has been done, the traces in the various sets are stacked as indicated at 28 to enhance the reflections and suppress noise and multiple reflections. The cross-section which is produced is indicated at 29.

In actual practice, a final step 30 is applied to the seismic sections to enhance the reflections for non-surface-consistent static time shifts. This procedure is referred to as TVRSTAT and is described in U.S. Pat. No. 4,206,509 Ruehle. A final stacked section is produced at 31.

It will be appreciated that the present invention has the unique ability to stack traces to selectively enhance reflections from particular types of interfaces. Specifically, the present invention will enhance reflections from interfaces with formations having a significant difference in the longitudinal wave to shear wave velocity. As previously noted with respect to FIG. 2, these formations include the water or oil and gas saturated rocks.

Figure 6:
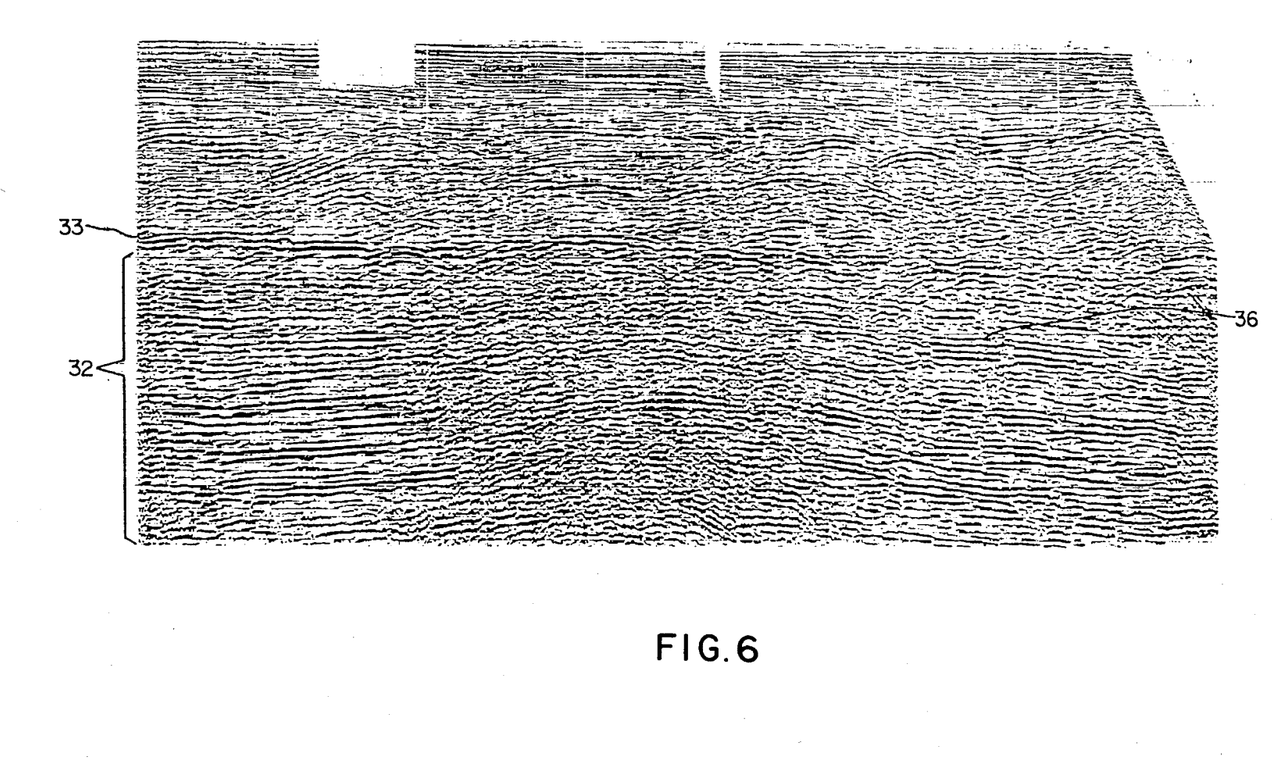
FIG. 6 is a seismic section which has been conventionally stacked.
Figure 7:
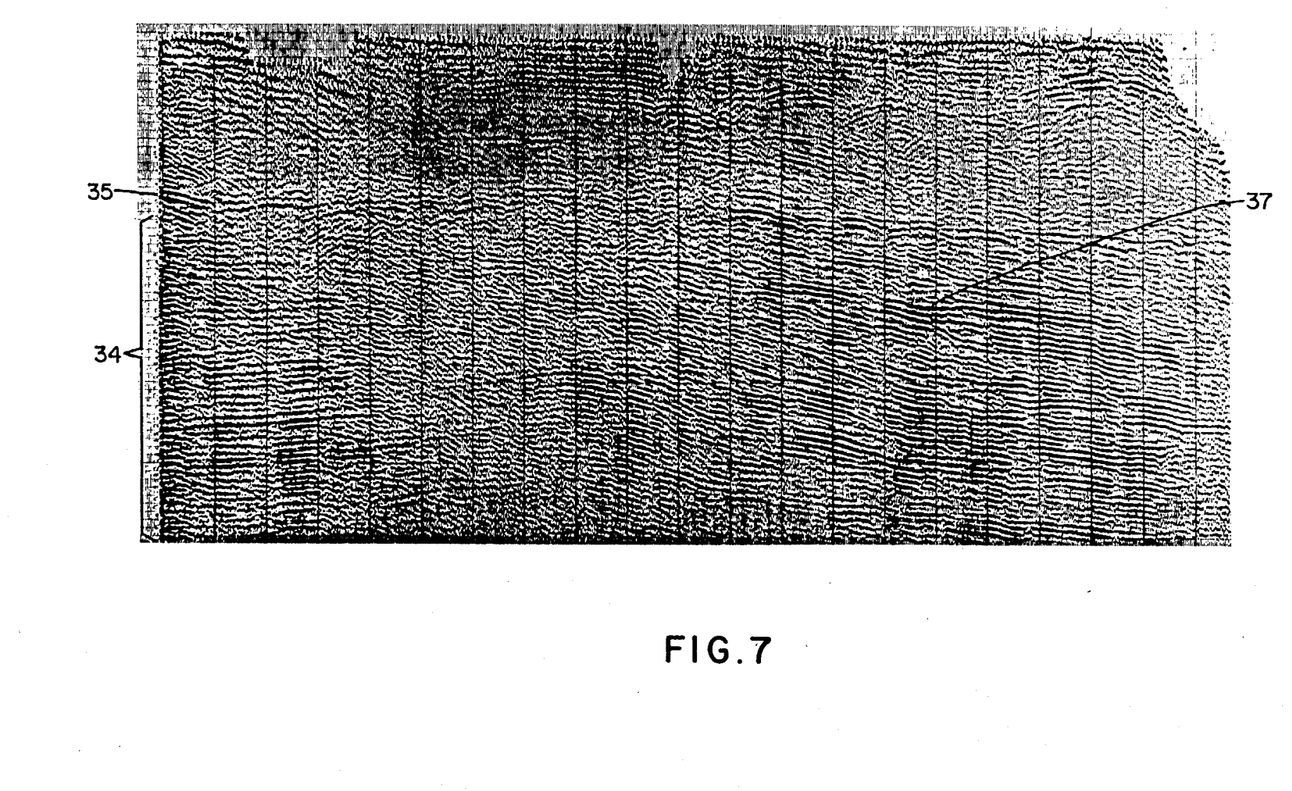
FIG. 7 is a seismic section which has been stacked in sets of longitudinal to shear wave common reflection points in accordance with the present invention.

FIGS. 6 and 7 are examples demonstrating the advantages of the present invention. FIG. 6 is a seismic section which has been stacked with conventional 32-fold common depth point gathering and stacking techniques. FIG. 7 shows a seismic section from the same field traces which have been gathered on an asymmetrical common reflection point with an assumed ratio of $V_p/V_s$ of 1.73. In FIG. 6 reflections 32 below the unconformity 33 display strong interference possibly from p multiple reflections and p/s converted reflections. In FIG. 7, reflections 34, below the unconformity 35, display lack of interference, good reflection-to-noise ratio and continuity. In particular, compare the reflections 36 and 37 on FIGS. 6 and 7. This general reflection quality improvement is interpreted as resulting from the p/s processing described herein.

A similiar processing flow and gather can be performed for a s/p mode conversion with similar results.

While a particular embodiment of the invention has been shown and described, various modifications are within the true spirit and scope of the invention. The appended claims are, therefore, intended to cover all such modifications.

What is claimed is:

1. A method of enhancing seismic sections of areas containing subsurface formations which generate shear wave reflections from longitudinal wave excitation, comprising:

generating seismic energy and detecting reflections of said energy with a plurality of offsets between the source and detector to produce a plurality of field seismograms, which include reflections from asymmetrical, common reflection points where there is a conversion between longitudinal and shear waves;

determining the velocity of said energy in the earth formations to said asymmetrical common reflection points;

determining the asymetrical reflection point for the field seismograms from the velocity determined in the preceding step and from the course to detector offset for the seismogram;

gathering said field seisomograms into sets having reflections from said asymmetrical common reflection points;

determining the velocity of said energy in said earth formations from said gathered sets of field seismograms;

normal moveout correcting said gathered sets of field seismograms using the velocity determinations from said preceeding steps.

enhancing said gathered sets of seismograms to correct for non-surface consistent static time shifts; and stacking said sets to produce a seismic section which emphasizes the reflections from said asymmetrical reflection points at which there is a conversion between longitudinal waves and shear waves.

2. The method recited in claim 1 further comprising:

determining the longitudinal wave to shear wave reflection point for each field seismogram from the source to detector offset for that seisomogram and from the longitudinal and shear wave velocities for the formations being explored; and gathering seismograms having common longitudinal to shear wave reflecting points into sets.

3. The method recited in claim 1 further comprising:

determining the velocity of the subsurface formations from the seismograms gathered into sets having reflections from asymmetrical common reflection points.

4. The method recited in claim 3 further comprising:

normal move out correcting the field seismograms with the velocity determined in the preceding step and thereafter stacking the normal moveout corrected seismograms.

* * * * *